BERNARD RABUSSIER,
JEAN PIERRE MANDON and
CLAUDE HENNART, Inventors

Attorneys

United States Patent Office 3,698,974
Patented Oct. 17, 1972

3,698,974
PROCESS FOR THE MANUFACTURE OF APPARATUS FOR EMITTING OF INSECTICIDAL VAPORS
Bernard Rabussier, Aventon, Jean Pierre Mandon, Poitiers, and Claude Hennart, Aubervilliers, France, assignors to Ciba-Geigy AG, Basel, Switzerland
Filed July 7, 1969, Ser. No. 839,721
Int. Cl. B32b 32/00
U.S. Cl. 156—87     19 Claims

ABSTRACT OF THE DISCLOSURE

A process for the manufacture of apparatus for emitting insecticidal vapors. A fibrous absorbent mass, flat in shape, is impregnated with volatile insecticidal substance, pure or in solution. At least one of two principal external faces of the fibrous mass is adhered to a diffusion panel, and the fibrous mass and the diffusion panel are mounted in a mounting of several elements constituted of polymeric plastic material forming together an evaporation apparatus, and a package serving for storage of the apparatus before use, and a system of soldering between the said elements constituting the diffuser, the diffusion panel and the said package.

DESCRIPTION OF THE INVENTION

The present invention concerns a process of manufacturing devices designed to emit, at room temperature, insecticidal vapors, or products such as insect repellants, which will make it possible to combat insects in enclosed spaces.

The process of fabrication envisaged by the invention is intended to facilitate the industrial production of devices which will assure a prolonged diffusion and substantially constant discharge of at least one insecticidal agent, devices which can be stocked without alteration before use, and which assure, when put to use, a lasting protection against insects, notably flies, mosquitoes and mites.

It has been found desirable to produce industrially, devices which are permanent diffusers of insecticidal vapors, particularly where the latter is constituted by dimethyl dichlorovinyl phosphate (or DDVP). This phosphoric ester possesses remarkable insecticidal properties, particularly against flies in domestic quarters.

Compositions having a homogeneous structure have already been produced in which DDVP is used in the form of a solid solution in various substances to provide blocks, cakes or analogous masses having a homogeneous structure, for example, as shown in the French Pat. No. 1,343,700. However, such compositions are often sensitive to heat, with consequent risk of partial fusion, which could lead to serious accidents when the drops flow. Further, when the retention of the DDVP is not strong, there is always some exudation of the active material, even without a rise in temperature. If, in order to avoid this risk, one uses a solid mass with a strong retention for DDVP, the evaporation decreases rapidly with time, and the yield is poor since unused DDVP remains.

Evaporative devices having a heterogeneous structure are also known, consisting of a reservoir of liquid insecticide, preferably DDVP, which feeds a diffusion panel permeable to this agent, preferably of plasticised polyvinyl chloride or a thin sheet of polyethylene (example French Pat. No. 1,310,865). In evaporators of this kind, the presence of a relatively large quantity of liquid DDVP in the reservoir involves serious risks of poisoning during storage, transport or use if the reservoir is inadequately sealed or deteriorates. This danger creates a serious problem in selecting material for the reservoir, and necessitates the provision of a protective exterior for the evaporative device which protests against the deterioration of the reservoir and/or the diffusion panel.

The French Pat. 1,535,792 relates to evaporative devices in which there has been applied to a substance containing DDVP in the form of a solid solution in a thermoplastic material, an exterior diffusion panel permeable to DDVP and consisting of a thin layer of a thermoplastic material such as polyethylene. There are two types of methods for producing such evaporators:

(a) the exterior diffusion panel is a film, separated from the substance containing the insecticide;
(b) the exterior diffusion panel is a laminated product attached to the substance containing the insecticide.

The evaporators made according to process (a) have the drawback that they require a relatively large evaporation surface for two reasons:

(1) it is very difficult to use industrially very thin plastic panels without also providing a support;
(2) the transmission of the DDVP between the solid solution and the exterior diffusion panel is bad where these two constituents are not adhered to each other.

The method (b) involves great technological difficulties, for it is very difficult to bring about close adherence between a thin film of polymer with a mass of another polymer permanently diffusing gas or exuding liquid. (There is no example given of this type of procedure in the French Pat. 1,535,792.)

The process followed in the present invention envisages the industrial manufacture of apparatus for the emission of vapors of insecticidal substances, particularly of phosphoric esters such as DDVP. The method of manufacture is characterised by the impregnation of at least one pure active insecticide substance, or a substance in solution, into a fibrous absorbent flat plate, which is provided on at least one of its two principal external faces, with a layer of polymeric material, the nature of the polymeric material and its thickness being such as to enable the vapors of the insecticidal substance to diffuse and yet not being permeable to the humidity in the surrounding atmosphere. The layer is positioned on the plate in intimate adherence therewith. A system of connections are provided between the elements of the evaporation device which are made of polymeric material and those of the packing for the device for storage before use.

It has been found that the fibrous mass is capable of feeding the diffusion layer continuously due to the close contact, the layer being advantageously constituted by a film of plastic material such as polyethylene, polypropylene or a copolymer with a high content of vinylidene chloride.

The phosphoric ester migrates across this polymeric diffusion layer which severely limits the humidity in the atmosphere from penetrating the fibrous mass serving as a reserve for the ester. It is very important to limit as far as possible penetration of the mass by humidity, for it is well-known that phosphoric esters, and particularly DDVP hydrolyse easily.

Preferably the fibrous mass is constituted by a porous plate formed of agglomerated fibres, while the insecticidal agent is constituted by a solution of phosphoric ester in a non-volatile hydrophobic diluent such as a dialkyl phthalate.

The invention will now be described in greater detail in connection with the accompanying drawings, in which.

The general process of industrial manufacture, according to the invention, includes the following operations:

1–(a) coating, preferably continuously, one face of a fibrous absorbent plate with a thin layer of polymeric material which is destined to act as a diffusion panel, followed by cutting the fibrous plate into plates of any shape or size;

1–(b) sealing a flexible or rigid frame of thermoplastic material, preferably of the same nature as the coating of polymeric substance on the fibrous plate, along the periphery of the coated face of the plates formed as in 1–(a);

1–(c) dessication of the ensemble formed as in 1–(b);

1–(d) impregnating the ensemble produced by operations 1–(b) and 1–(c) with a determined quantity of phosphoric ester, either pure or in solution;

1–(e) joining two impregnated elements resulting from the previous operations by sealing the frames thereof to each other with the two fibrous uncoated faces positioned one against the other and with the two coated faces constituting the external faces of the evaporation apparatus;

1–(f) sealing along the periphery of each of the two faces of the evaporation device a sealing sheet designed to prevent evaporation before the apparatus is put to use.

Preferably, operations 1–(c), 1–(d), 1–(e) and 1–(f) are carried out in a dry atmosphere, and when manual movements are necessary for these operations they should be made in a protective enclosure such as a glove box.

In certain variants of general procedure, the order of different operations can be changed. In particular, in placing the apparatus in a rigid frame, the operation 1–(f) is performed preferably before operation 1–(b), thus allowing control to be exercised of the quality of the sealing of the sealing sheet on the frame by control of the pressure.

We will now detail the characteristics of the constituent elements necessary for the general process:

The substance constituting the absorbent fibrous plate must have a good absorbent capacity and good power of retention of the chosen insecticide (preferably DDVP) with respect to which it must be neutral. Furthermore, the absorbent plate should not contain impurities likely to react with the insecticide and must be capable of easy dehydration.

In view of the above, the absorbent plate is constituted preferably by one of the following substances: a strong non-sized paper, a card of non-sized cellulose, a wool felt, a felt card, a cardboard made of old papers, a pack of glass fibre, a felt of glass fibre or a non-woven fabric.

On the other hand, the thin coating of polymeric material is constituted preferably by one of the following substances: a polyethylene, a polypropylene, a mixture of polyethylene and polypropylene, a copolymer of ethylene and propylene, or a copolymer with a high content of chloride of vinylidene. When a copolymer of chloride of vinylidene is used its content of chloride of vinylidene is generally between 75 and 97% and preferably between 87 and 95%. The copolymerised substances can be in particular chloride of vinyl acrylic esters, acrylonitrile.

The diffusion layer does not have micropores which, if they existed, would lead to a permeability by flow, thus being non-selective. The slow passage of the DDVP occurs by activated diffusion, that is to say, by a movement molecule by molecule from one free space to another, with substantial interaction between the membrane and the diffusing molecules. The quantity of product traversing the membrane per unit of time increases with an increase in the temperature, and the diffusion is selective. The diffusion of the diluent is practically nil, and the absorption of humidity is very weak, even though the DDVP is hygroscopic.

The thickness of the layer of polymeric material is generally between 10 and 80 microns, and preferably between 20 and 40 microns.

The frame of thermoplastic substance can be either flexible, semi-rigid or rigid. In the case of a flexible frame it is preferably cut out of a sheet of thermoplastic substance of the same nature as that of the diffusion layer but having a thickness that is from 4 to 20 times as great. In the case of a semi-rigid or rigid frame, it is preferably obtained by moulding from a thermoplastic substance of the same nature as the diffusion layer. The rigidity of the frames obtained by moulding comes from their shape and thickness. Frames obtained by moulding are advantageously equipped with bars constituting a grille for the protection of the evaporation surfaces. This grille prevents contacts with the evaporation surfaces, and prevents young children from tearing or sucking them.

The insecticide destined to be impregnated into the fibrous absorbent plate is generally a liquid phosphoric ester, preferably DDVP; in any case, the DDVP or the active substance should be as pure as possible, at least equal to 95%. Its acidity should be as weak as possible. The active agent is advantageously put in solution in a non-volatile diluent hydrophobe. This should not be reactive with DDVP, nor should it be such as to provoke its decomposition over a period of time. It should be liquid at ordinary temperature. It should be miscible with DDVP at ordinary temperature and at the concentration for use. Preferably, the tension of the vapor of the diluent at 20° C. should be less than 0.03 mm. of mercury. Under these conditions the diluent is advantageously a heavy dialkyl phthalate, for example dioctyl phthalate; a silicon oil miscible with DDVP, for example oil SI 555 of Dow Corning; a fatty acid ester, for example isopropyl myristate; a fatty alcohol, for example lauryl alcohol; a vegetable oil, for example castor oil, linseed oil, soya oil.

The amount of diluent in the active solution is generally between 0 and 40%, preferably between 10 and 20%.

The solution formed by the insecticide and the diluent may also contain other ingredients such as stabilizers, synergistic compounds, perfumes and dyes.

The quantity of insecticide supplied to each apparatus depends on the nature of the insecticide, the space to be treated, the length of time for which it is required and the residual retention of the DDVP in the fibrous absorbent plate. The quantity will be about 15 to 25 g. of DDVP for an apparatus intended for a space of 30 m.$^3$ for a period of three months.

The sealing sheet is constituted of a thermoplastic material of the same nature as that of the frame, with sufficient thickness (for example 0.5 mm. of high density polyethylene) to ensure that the diffusion of the phosphoric ester will be negligible during storage. Preferably the sealing sheet is a multilayer ensemble, heat-sealable on one face, of the type known in the packing field as a "complex." The complexes known are very numerous; the number and nature of their layers are variable. One finds in different complexes the following layers: paper, aluminium, low-density polyethylene, high-density polyethylene, polyamide, polyester, copolymer of vinylidene acetate of cellulose, etc. According to the method of manufacture in accordance with the invention, it is necessary to choose a "complex" the layers of which will not delaminate on contact with the vapours of the phosphoric ester, and it is preferable to choose a "complex" the internal layer of which is made of a thermoplastic substance of the same nature as the frame of the diffusion apparatus.

The following procedural operations are necessary:

The deposition and adherence of the diffusion layer on the fibrous absorbant plate is achieved, preferably continuously, by methods known and used in the industrial manufacture of papers and packaging cartons coated with a layer of plastic substance. The deposition can be made in one or more successive layers (or coats). In the case of polyethylene, the deposition can be effected either by the technique known as extrusion-lamination, or by coating with an aqueous or organic dispersion of very fine polyethylene powder; this last technique, described by McSharry, Howell and Menering in "Plastiques Modernes et Elastomeres," April 1968, has the advantage of giving a highly superior bonding of the polyethylene to the plate. In the case of vinylidene copolymer, the deposit is preferably obtained by coating from an aqueous dispersion, for example the product IXAN WA of the Solvay Company. One can also use a solution of the plastic substance in a volatile solvent which is uniformly sprayed on one of the faces of the plate. The adherent deposit is also obtained by "sticking" that is to say by heat-lamination of a film on the fibrous plate. This technique is generally less successful as it does not give good adherence.

The cutting into plates is carried out by known methods, for example with a paper-cutter for square and rectangular shapes or with a punch-press for the other shapes.

The sealing along the periphery of the coated face of the plates on the frame of thermoplastic material is effected over a width of about 2 to 5 mm. by a thermal seal with the aid of a metal heating block of the same shape as the absorbent plate. The temperature of the heating block depends on the nature and thickness of the thermoplastic substance. This temperature should be controllable to a precise degree. Further, the heating block should exert a certain pressure between the pack of absorbent plates and diffusion layer or layers and the frame in order to assure hermetic sealing; this pressure should be controllable to a precise degree, and to this end the movement of the heating block or of its plate is preferably controlled by a pneumatically driven screw with a delay mechanism. When the frame is a flexible frame, that is, a fairly thin frame, the heating block is applied to the frame. When the frame is a rigid frame, that is, a relatively thick one, the heating block is applied to the non-impregnated face of the pack, the heat necessary for the fusion of the diffusion layer being transmitted through the fibrous plate.

The desiccation of the pack mounted on the frame is carried out by known methods, for example by submitting the pieces to infra-red rays in a tunnel, taking care to turn the non-coated face of the pack towards the rays. The temperautre in the desiccation means should be regulated in such a way that it does not induce permanent deterioration or deformation of the thermoplastic parts. The length of time in the desiccation means depends on the temperature and on the humidity in the fibrous plate.

The impregnation of the fiborus plates, coated and mounted on the frame, by the phosphoric ester, pure or in solution, is effected, for example, by distribution of the liquid by the application of a dosage material to the plates while they are in a horizontal position. The speed of distribution should be regulated according to the speed of absorption of the liquid by the plate, so that the liquid does not soil the frame. Different methods of impregnation can be used in different general procedures.

The junction of the frames of two impregnated elements is effected by a sealing method which depends whether each frame is a flexible frame, with a relatively small thickness or a rigid frame which is relatively thick.

When the frames are flexible frames the junction is made over a width of about 2 to 5 mm. by heat sealing between two heating blocks similar to one another, which blocks form a grip or pincer, the shape of which corresponds to that of the frame. The two heating blocks are either metallic blocks identical to those used for the sealing of the coated sheets to the frames, or rigid armatures furnished with a heating ribbon. The temperature, the time and the pressure of the pincer grip, and the cooling time while keeping the frames under pressure when a heating-ribbon device is used are determined by the nature and thickness of the thermoplastic material of the flexible frame. The joining of the flexible frames can also be effected by heat welding with the use of a heating wire.

When the frame is a rigid frame the junction is made over a width of 1 to 3 mm. (approx.) preferably by a procedure known by the name of heated tool welding.

The sealing of the sealing sheet on the frame is effected over a width of about 1 to 10 mm. preferably by heat welding, with the use of a metallic heating block similar to that used for the sealing of the coated plates onto the frames. When the sealing sheet is a "complex" including a sheet of aluminium, one can also use a solder technique using heat energy developed by a high frequency current.

Other, well-known soldering techniques, different from those described in the details of the assembly operations can also be used where appropriate.

There are described hereinatfer certain variants of the constituent elements of the general procedure; these variants can be used singly or in combination with others:

2–(a) The frame has an orifice, a ring, an auto-adhesive surface or any other means for causing the diffuser to be attached.

2–(b) When the frame is rigid or semi-rigid it has feet or any other means for maintaining the diffuser in a vertical position on a horizontal surface.

2–(c) The capacity in absorption of the emission apparatus of pure phosphoric ester or phosphoric ester in solution is increased by the insertion of one or more uncoated plates of absorbent material between the two coated absorbent fibrous plates. The uncoated plates inserted are of the same nature or of a different nature from the coated plates.

2–(d) Only one fibrous absorbent plate is used, which plate is relatively thick and coated on both sides instead of an assembly of two plates each coated only on one side.

2–(e) Only one fibrous absorbent plate is used, which plate is coated only on one side, the liquid applying device applying liquid to only one side. In this case the assembly has only one frame.

2–(f) Where there is only a single diffusion surface the non-diffusing surface of the assembly consists of a watertight reservoir, preferably moulded from a thermoplastic substance of the same nature as that of the frame supporting the diffusion layer.

2–(g) The impregnation liquid containing the phosphoric ester is absorbed in a holder or is gelatinized to form a paste or cream.

2–(h) The frame is metallic, for example of galvanized hoop iron or aluminium with anti-corrosive varnish on the inside.

The following variants of the general procedure can be used singly or in combination:

3–(a) The adherent coating of polymeric material (diffusion layer) is deposited on a thin sheet of non-absorbent paper, non-woven fabric or similar material, instead of being deposited on a fibrous absorbent plate. One cuts this thin coated sheet to the required shape. By the application of pressure, with heat, the coated face of the thin sheet is made to adhere to a fibrous absorbent uncoated plate previously cut to a slightly smaller size, so that the thin coated sheet projects beyond the perimeter of the fibrous absorbent plate. Impregnation is carried out, then the two coated elements are joined in such a way that the two fibrous surfaces are against each other. The edges of the two elements are then sealed, due to the presence of the coating of the polymeric material. Thus there is produced a watertight assembly without a frame.

3–(b) Omitting the cut or moulded thermoplastic frame: The sealing of the edges and the assemblage where the device is composed of multiple plates is achieved by treating the edge with a coating of plastic substance in the form of a concentrated solution, which is then dried, or a coating of melted plastic substance which is later solidified by cooling.

3-(c) When the absorption capacity is increased by inserted absorbent plates [variant 2-(c)] these plates can be held on the coated plates by one or several spots of glue to facilitate the subsequent operations in the manufacture.

3-(d) When a single fibrous absorbent plate coated on both sides is used [variant 2-(d)] the active liquid is injected into the absorbent fibrous mass by the use of a hollow needle introduced into the edge of the plate.

3-(e) When the frame is a flexible frame the joining of the frames can be effected by partial sealing before impregnation, thus forming a kind of sachet with an opening through which can be introduced the active liquid between the two fibrous absorbent plates. The frames are then finally closed.

3-(f) When the frames are semi-rigid or rigid frames of thermoplastic material, the frames are joined by sealing before impregnation. A hole is made in the side of the frames and the active liquid is injected between the two fibrous absorbent plates by means of a hollow needle inserted through the hole. Then the hole is stopped up by fusion of the thermoplastic material, or by the addition of a little more of the material.

3-(g) When the absorption capacity is increased by providing inserted absorbent plates [variant 2-(c)] impregnation is limited to these sheets, and is effected by dipping them into the active solution.

3-(h) When the frame is metallic [variant 2-(h)] it is sealed hermetically on the diffusion layer by crimping in lieu of heat welding.

3-(i) Where one of the diffusion surfaces is replaced by a watertight reservoir [variant 2-(f)] the active solution is introduced directly into the reservoir, which then receives the coated fibrous absorbent plate and is mounted on its frame.

3-(j) Where the active solution is absorbed or gelatinized [variant 2-(g)] impregnation is effected by the deposition of a paste or cream on the absorbent fibrous plate. The diffusion of the active solution in the fibrous absorbent plate occurs slowly and of its own accord after the frames have been sealed.

3-(k) Where the frames are flexible frames, or in the absence of a frame [variants 3-(a) and 3-(b)] the insecticidal agent without an absorbent plate is placed in a barred or perforated cavity.

3-(l) Instead of sealing sheets sealed on to the frame a sealing sachet is used, with thermo-sealed edges into which the insecticidal agent has been introduced.

3-(m) Instead of sealing sheets sealed on to the frame an airtight metallic box is used, designed to be opened by hand, for example, a system known as "Tir-Hop."

Figures 1, 2:
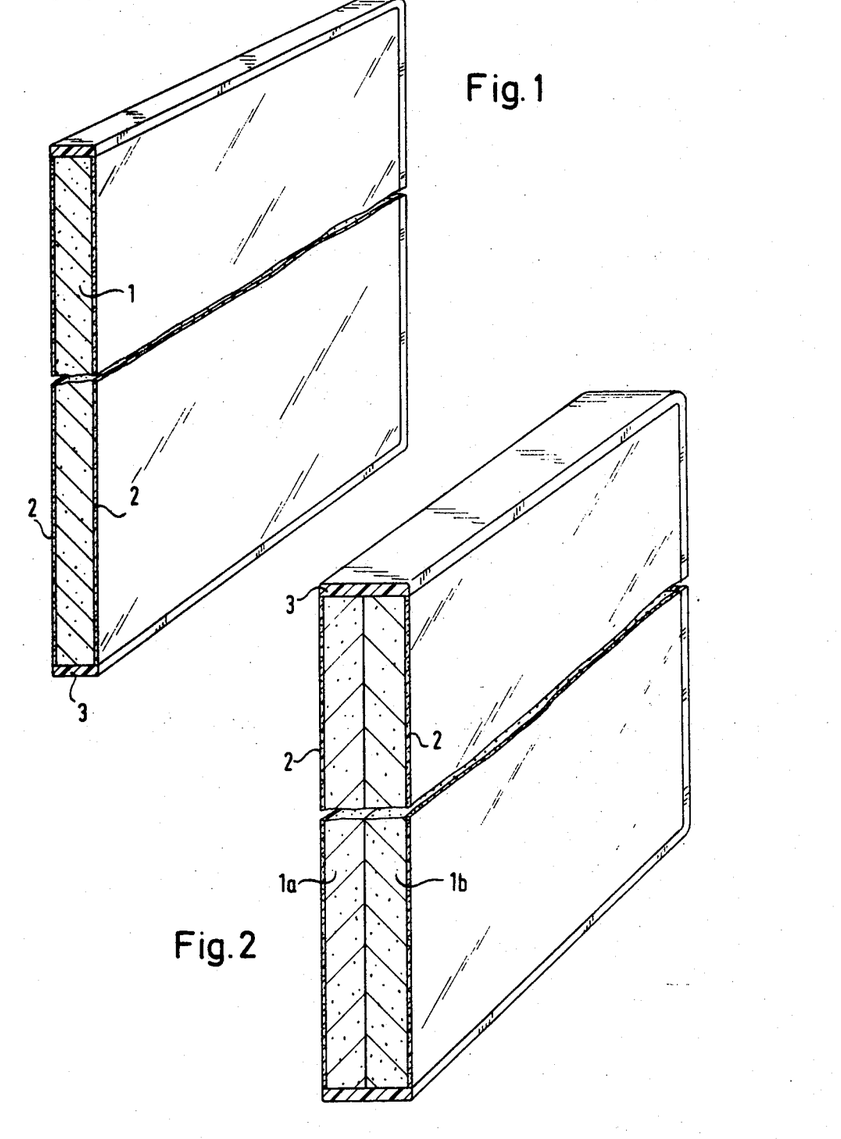
FIG. 1 is a partial schematic view, partly in perspective and partly in section, of one embodiment of the apparatus according to the invention.
FIGS. 2–5 are views similar to FIG. 1 of different embodiments of the apparatus according to the invention.

FIG. 1 shows a form of the apparatus produced according to the variants 2-(d), 3-(b), and 3-(d) of the general procedure. In this figure, 1 is the fibrous absorbent plate, rectangular in shape, the two large surfaces of which are covered by two diffusion layers 2, and to which the diffusion layers are attached. The edges of the assembled plate and sheets is sealed by a frame-like member 3 of thermoplastic substance.

FIG. 2 shows a form of the apparatus produced according to variants of the method. In this figure 1-(a) and 1-(b) are the fibrous absorbent rectangular plates, juxtaposed and pressed against one another. Each absorbent plate is covered on one side by a diffusion layer 2, adhered thereto. The edges of the assembly are sealed by a frame-like member 3 of a plastic substance.

Figures 3, 4:
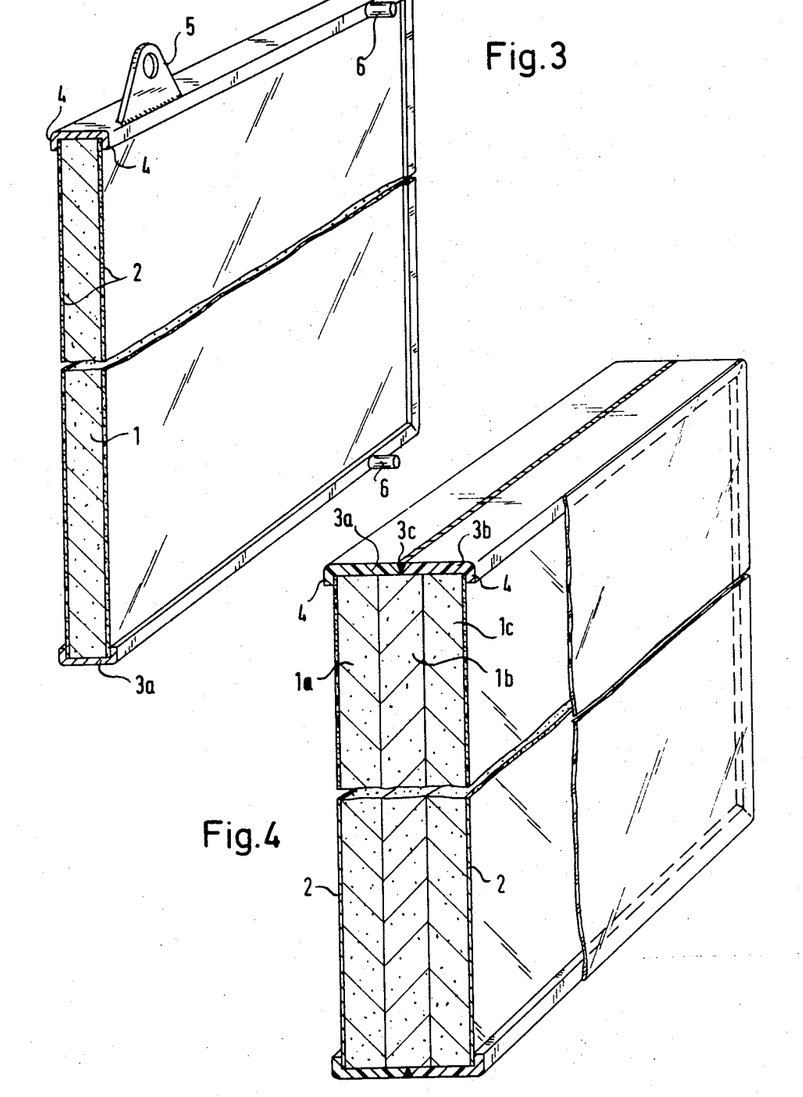

FIG. 3 is a view like FIG. 1, but of another apparatus made according to the variants 2-(a), 2-(d), 2-(h), 3-(d), 3-(h). In this figure the fibrous absorbent plate 1 has a rectangular shape, the two large surfaces of which are covered by two diffusion layers 2 which adhere to said surfaces. The assembly is mounted in a metallic frame 3a, the edges 4 of which bend inwardly and grip the layers 2. The emission apparatus also comprises an apertured tab 5 and boses 6, designed to hold the layer 2 facing the wall while spaced at a certain distance therefrom to allow free circulation of air and permit good diffusion of the insecticidal vapours.

FIG. 4 is a view analogous to that of FIG. 2 of another embodiment made according to variant 2-(c). In this figure fibrous absorbent plates 1a and 1c, rectangular in shape, are covered by two diffusion layers 2 which are stuck to the outside surfaces of plates 1a and 1c. Plate 1b is a non-coated absorbent plate between plates 1a and 1c. The assembly is held together by frame-like members 3a and 3b which are sealed to each other by thermoplastic sealing substance 3c. The diffusion layers 2 are sealed at their edges to plates 1a and 1c by the inside of the rim and on frame-like members 3a and 3b. The two impervious sheets 5a and a second sheet not visible in the figure are sealed on to the outside of the rim of the frame-like members 3a and 3b.

Figure 5:
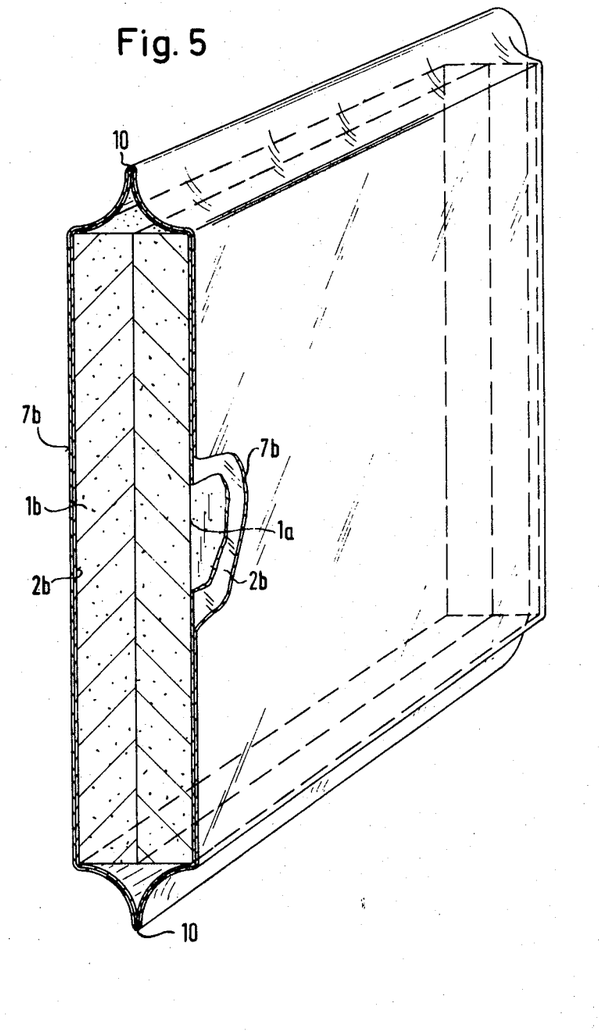

FIG. 5 is a similar view of another emission apparatus made according to variant 3-(a). In this figure 1a and 1b are fibrous absorbent plates rectangular in shape on the outside surfaces of which have been adhered sheets of paper 2a and 2b which have polymer coatings 7a and 7b thereon, respectively.

The sheets of paper have dimensions slightly larger than those of the fibrous absorbent plates. After impregnation, the two sub-assemblies each consisting of a plate and a sheet of coated paper are joined, and the edges of the sheets around the whole perimeter are melted or soldered together at 10. This emission apparatus thus includes two sheets of paper 7a and 7b as exterior surfaces.

Figure 6:
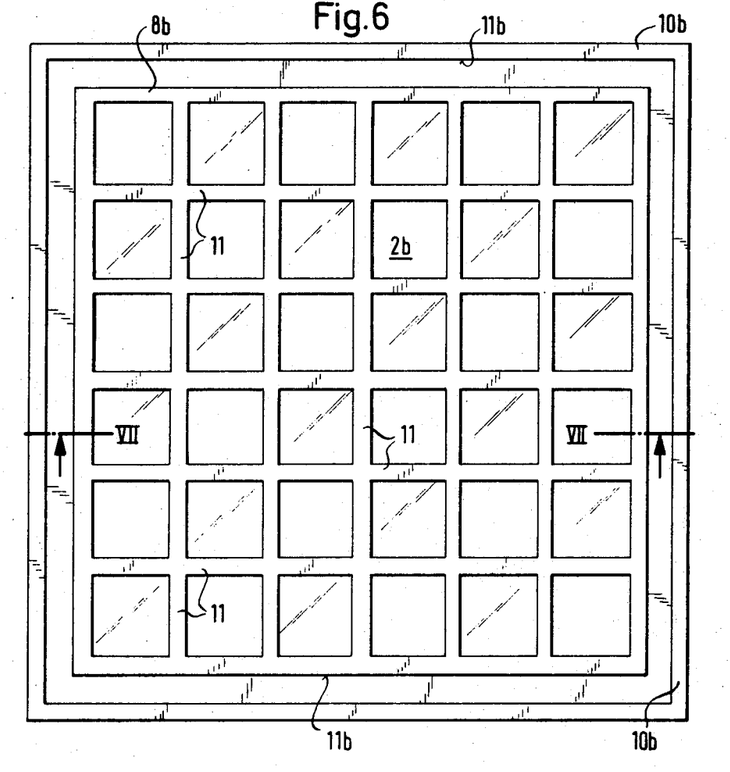
FIG. 6 is an elevation view of a further embodiment of the apparatus according to the invention.
Figure 7:
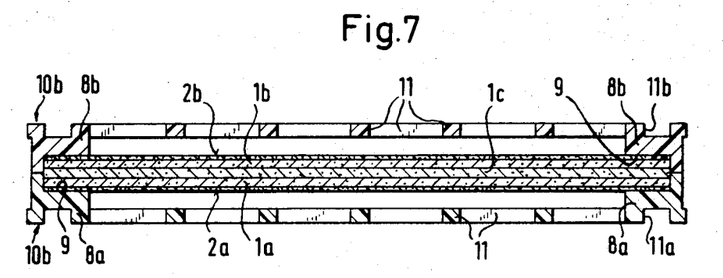
FIG. 7 is a section taken on line VII—VII of FIG. 6.

FIGS. 6 and 7 show a particular industrial version made according to variants 2-(c) and 3-(g).

As seen in FIG. 7 two fibrous absorbent plates 1a and 1b, together with their respective diffusion layers 2a and 2b, have the edges lodged in groove 9 of the two half frames 8a and 8b which are to be joined one to the other along one of their faces. The surface of the diffusion layers 2a and 2b have the peripheral portions secured or joined by soldering or the like to the contact surface of groove 9. Plate 1c of fibrous material impregnated with the insecticide is placed between the two assemblies each made up of a plate and a diffusion layer before the assemblage of the two half frames 8a, 8b. The two half frames 8a, 8b are advantageously made of a plastic material (for example of polyethylene) and the periphery of the frames serve as supports for the cross bars 11, for example molded integrally with the frames and constituting protective grilles situated at a relatively great distance from the diffusion layers 2a and 2b.

This arrangement avoids any accidental contact with layers 2a and 2b, and prevents children from tearing or licking them. Security can thus be assured. At the same time, the two half-frames, while sealing the edge, maintain the elements of the apparatus in contact and give the apparatus rigidity.

After some days' storage the insecticide solution initially contained in the plate 1c has spread uniformly by capillary action among the three fibrous plates 1a, 1c and 1b.

Good preservation in storage is ensured by sealing the edges of the sealing sheets on to the edge of the frame, as in frames 10a and 10b.

At the time of use the sealing sheets are easily cut by continuous perforation if there has been formed for this purpose in the two lateral faces of the frame a groove as 11a and 11b.

The emission apparatus according to the invention has the following notable advantages:

long duration of action (1 to 6 months)
regularity of evaporation with time
good storage quality before and during use
safety during storage, transport and use
low cost.

This combination of advantages is peculiar to the combination of methods envisaged by the invention.

There will now be described two detailed examples of a diffusion apparatus and the results obtained from tests of these embodiments:

(A) DIFFUSION APPARATUS OF FIG. 4

(a) Coated plates 1a or 1c

Grey card made of old papers having a weight of 560 g./m.$^2$ with a coating of 45 g./m.$^2$ of polyethylene. Square format 14 x 14 cm.

(b) Intermediate plate 1b

Cellulose card, unsized, 1000 g./m.$^2$. Square format 14 x 14 cm.

(c) Active solution

|  | Percent |
|---|---|
| DDVP, technical at 96% | 76 |
| Dioctyl phthalate | 20 |
| Epoxidised soya oil | 4 |

Total quantity impregnated into the three plates: 51 g., that is 15 g. on the intermediate plate and 8 grammes on each coated plate.

(d) Assembly

The diffusion layers 2 are soldered at their edges on to the interior surface of the rim 4 of the two frames of polyethylene 3a, 3b, of 2 mm. thickness. The two frames, 3a and 3b, are soldered to each other by a heated welding tool at 3c. The two sealing sheets 5a and the other sheet are soldered on the exterior surface of the rim 4.

Put into service in a room at 22° C. this diffusion apparatus emits the insecticidal vapours of DDVP at a constant level of about 100 mg./day for 130 days. At the end of 65 days of emission the diffuser is placed in a closed chamber 30 m.$^3$ free from all products of insecticidal action. The temperature of the room is 25° C. and the hygrometric degree is 40%. As soon as the diffuser has been put into the room, 100 domestic flies (*Musca domestica*) are introduced. At the end of 49 minutes it is noted that half these flies are in decubitus dorsal. The figure is 87% at the end of an hour.

(B) DIFFUSION APPARATUS OF FIG. 5

(a) Coated paper 2a, 7a or 2b, 7b

Bleached kraft paper 40 g./m.$^2$
Coating of copolymer of vinylidene chloride in an amount of 20 g./m.$^2$ in two layers
Square format 12 x 12 cm.

(b) Absorbent plate 1a or 1b

Cellulose card, nonsized, 1000 g./m.$^2$
Square format 10 x 10 cm.

(c) Active solution

|  | Percent |
|---|---|
| DDVP, technical 96% | 76 |
| Dioctyl phthalate | 20 |
| Epoxidised soya oil | 4 |

Total quantity impregnated into the two plates 25 g.

Put into service in a room at 22° C., this diffusion apparatus emits insecticidal vapours of DDVP at a constant level of 175 mg./day (approx.) for 35 to 40 days. Emission at 60 days is still 125 mg./day. At the end of 50 days of diffusion the diffuser is placed in a closed room of 30 m.$^3$ free from all products with insecticidal action. The temperature of the room is 25° C. and the hygrometric degree is 35%. Immediately after putting the diffuser in the room, 100 flies (*Musca domestica*) are introduced. It is noted that half the flies are in decubitus dorsal after 28 minutes. The mortality is total at the end of 55 minutes. The same biological tests after 70 days of evaporation gives a decubitus dorsal of 50% in 30 minutes and 98% at the end of an hour.

If one takes as the limit of useful employment the time when the level of evaporation of insecticide is no more than 70% of the initial level, the balance sheet of the active material is as follows in the case of DDVP:

|  | Percent |
|---|---|
| DDVP regularly diffused | 65–75 |
| DDVP hydrolised in plates of fibrous material | 5–15 |
| DDVP remaining in the plates of fibrous material | 10–30 |

The duration and consistency of insecticidal effect are, in the two cases, particularly remarkable when one considers the simplicity and the low cost of the means employed.

We claim:

1. A process for manufacturing a device for the emission of vapors of an insecticidal substance, comprising the steps of:
   (a) providing a plate assembly of fibrous absorbent material and comprising at least one sheet of a fibrous material selected from the group consisting of strong nonsized paper, a card of non-sized celluolse, wool felt, felt card, cardboard of old papers, a pack of glass fibre, a felt of glass fibre, and non-woven fabric;
   (b) coating at least one principal outer face of said plate assembly with a diffusion layer of polymeric material having a composition and a thickness such that the vapors of a volatile insecticidal substance can diffuse therethrough and which is impermeable to the humidity of the surrounding atmosphere;
   (c) adhering said polymeric material of said diffusion layer intimately to the plate assembly;
   (d) providing a frame of a material taken from the group consisting of thermoplastic and metal, and which material is impervious to the insecticidal vapors, said frame having at least one opening opening out of one side thereof;
   (e) placing said frame over the plate assembly with the side having the opening contacting said diffusion layer so that the diffusion layer is exposed through the opening, whereby vapors emanating from said layer can pass through the opening;
   (f) hermetically sealing the frame along the periphery of each principal outer face of the coated fibrous plate assembly;
   (g) providing a volatile liquid insecticidal substance which will diffuse through said diffusion layer; and
   (h) charging said fibrous absorbent material sheet with said volatile liquid insecticidal substance.

2. A process as claimed in claim 1 in which the step of providing the frame comprises providing a frame of the same polymeric material as the material of the diffusion layer.

3. A process as claimed in claim 1 in which the steps of providing the volatile liquid insecticidal substance and charging the fibrous sheet comprises preparing a solution of a voilatle liquid phosphoric insecticide ester dissolved in a hydrophobic non-volatile diluent inert to the phosphoric and liquid ester at ordinary temperature, and impregnating said sheet with said solution.

4. A process as claimed in claim 1 in which the step of providing a frame comprises providing a rigid frame and the step of sealing the frame comprises carrying out heated tool welding along a width of 1 to 3 millimeters around the periphery of the frame.

5. A process as claimed in claim 1 in which the step of providing a plate assembly comprises providing two sheets of fibrous absorbent material and placing the two non-coated faces of the two sheets against each other, and the step of coating comprises coating the outer faces of the assembled pair of sheets.

6. A process as claimed in claim 1 in which the step of providing a plate assembly comprises providing two sheets of fibrous absorbent material and placing at least one further sheet of fibrous material between the opposed faces of the said two fibrous material sheets with all of the contacting surfaces of the sheets being uncoated, and the step of coating comprises coating the outer faces of the assembled sheets.

7. A process as claimed in claim 1 further comprising providing a sealing sheet which is impervious to the insecticidal vapors, and removably sealing said sealing sheet over the openings in said frame, whereby the covering material can be removed before the device is used.

8. A process in claim 7 in which the step of providing said frame comprises providing a rigid frame, and said sealing step is carried out prior to said step of placing the frame over the plate assembly.

9. A process as claimed in claim 7 in which the step of providing said sealing sheet comprises providing a sealing sheet of a thermoplastic material of the same nature as that of the frame, and which has a thickness sufficient to ensure that diffusion of insecticidal vapors will be negligible during storage of the apparatus.

10. A process as claimed in claim 7 in which the step of providing said sealing sheet comprises providing a multilayer ensemble which is heat sealable on one face, and the layers of which do not delaminate on contact with the insecticidal vapors.

11. A process as claimed in claim 7 in which the step of providing the frame comprises providing a plastic frame, and the step of sealing the sheets to the frame comprises applying a metallic heating block having a width of about 1 to 10 millimeters along the peripheral portion of the sealing sheet for heat sealing it to the frame.

12. A process as claimed in claim 7 in which the step of providing the frame comprises providing a plastic frame, and the step of providing a sealing sheet comprises providing sealing sheets which include a metal foil, and the step of sealing the sheets to the frame comprises applying a high frequency current to the sheets to develop heat in the metal foil for heat sealing the sealing sheets to the frame.

13. A process as claimed in claim 1 in which the charging step comprises the steps of desiccating the resulting framed assembly, providing an inlet in said frame, and then impregnating the one sheet of said assembly through the inlet provided in said frame with at least one volatile insecticidal liquid phosphoric acid ester, and thereafter tightly sealing said inlet.

14. A process as claimed in claim 1 in which all the steps are carried out in a dry atmosphere.

15. A process as claimed in claim 1 in which said polymeric material of the diffusion layer is a material taken from the group consisting of a polyethylene, a polypropylene, a mixture of polyethylene and polypropylene, a copolymer of ethylene and propylene, and a copolymer with a vinylidene chloride content of between about 75 and 97% calculated on the total weight of the copolymer, copolymerized with chloride of vinyl, with an acrylic or acrylonitrile.

16. A process as claimed in claim 1 in which the thickness of the diffusion layer is between 10 and 80 microns.

17. A process as claimed in claim 1 in which the step of sealing the frame comprises applying a heating block having a contour corresponding to that of the plate assembly to the frame along a width of about 2 to 5 millimeters around the frame to heat seal the frame to the plate assembly.

18. A process as claimed in claim 1 in which the step of sealing the frame comprises applying similar heating blocks which form a grip or jaw complex and which have a contour corresponding to that of the frame to the frame along a width of about 2 to 5 millimeters around the frame to heat seal the frame to the plate assembly.

19. A process as claimed in claim 3 in which the diluent in the solution of the volatile insecticidal phosphoric ester does not exceed 10% calculated on the total weight of the solution.

References Cited
UNITED STATES PATENTS

| | | | |
|---|---|---|---|
| 924,935 | 6/1909 | Revman et al. | 223—86 |
| 2,605,204 | 7/1952 | Benedict et al. | 156—87 X |
| 3,148,808 | 9/1964 | Griffin et al. | 223—86 |
| 1,877,247 | 9/1932 | Malley | 223—86 |

CARL D. QUARFORTH, Primary Examiner

S. R. HELLMAN, Assistant Examiner

U.S. Cl. X.R.

156—90, 305, 280, 272; 223—86

PO-1050
(5/69)

UNITED STATES PATENT OFFICE
CERTIFICATE OF CORRECTION

Patent No. 3,698,974        Dated October 17, 1972

Inventor(s) BERNARD RABUSSIER, JEAN PIERRE MANDON and CLAUDE HENNART

It is certified that error appears in the above-identified patent and that said Letters Patent are hereby corrected as shown below:

Add in the heading:

-- Claims priority application: France, Application No. 159 064, filed July 12, 1968. --

Signed and sealed this 6th day of March 1973.

(SEAL)
Attest:

EDWARD M. FLETCHER, JR.         ROBERT GOTTSCHALK
Attesting Officer        Commissioner of Patents